United States Patent [19]

McCullough

[11] Patent Number: 4,780,980
[45] Date of Patent: Nov. 1, 1988

[54] FISHING ROD HANDLE HAVING A LIGHT THEREIN

[76] Inventor: Billy B. McCullough, 11231 N. Memorial Dr., Owasso, Okla. 74055

[21] Appl. No.: 157,591

[22] Filed: Feb. 19, 1988

[51] Int. Cl.⁴ .............................................. A01K 87/00
[52] U.S. Cl. ...................................... 43/17.5; 43/18.1
[58] Field of Search ....................... 43/17.5, 17.6, 18.1

[56] References Cited

U.S. PATENT DOCUMENTS

| | | | |
|---|---|---|---|
| 3,862,509 | 1/1975 | Petersen | 43/17.5 |
| 4,026,059 | 5/1977 | Ochs | 43/17.5 |
| 4,085,437 | 4/1978 | Hrdlicka et al. | 43/17.5 |
| 4,621,447 | 11/1986 | Rhodes | 43/17.5 |

Primary Examiner—M. Jordan
Attorney, Agent, or Firm—Head & Johnson

[57] ABSTRACT

A fishing rod handle having a light therein is provided wherein the handle has an elongated cylindrical opening communicating with the rearward end, a rigid insert member having an integral tubular portion attached to the handle rearward end with the tubular portion received within the handle cylindrical opening, and having a battery in the handle cylindrical opening with a spring urging it in the direction toward the handle rearward end, and a bulb received in the tubular portion, and a switch attached to the ridged insert with circuitry connecting the switch, the bulb and the battery so that when the switch is in the "on" position the bulb is illuminated.

6 Claims, 2 Drawing Sheets

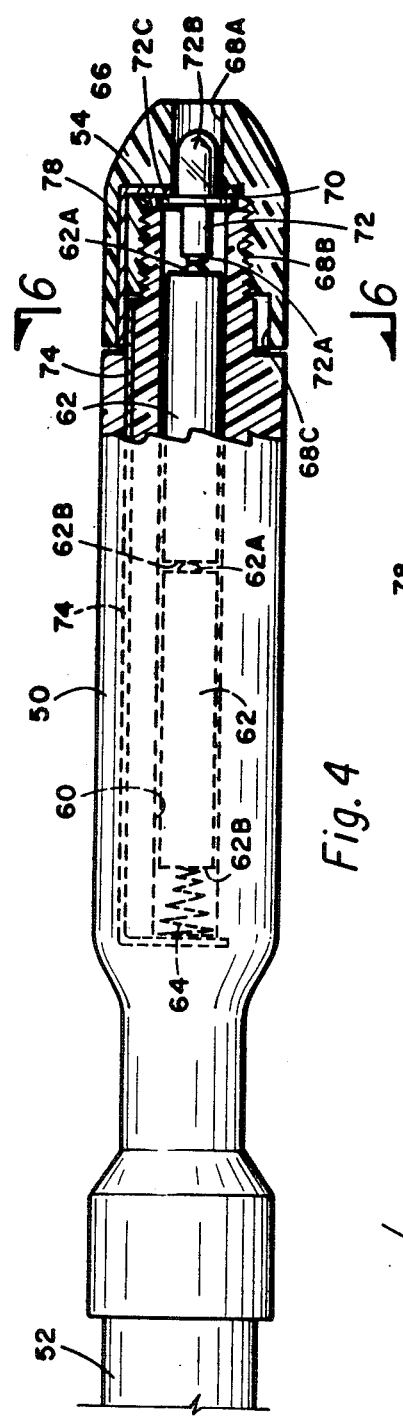
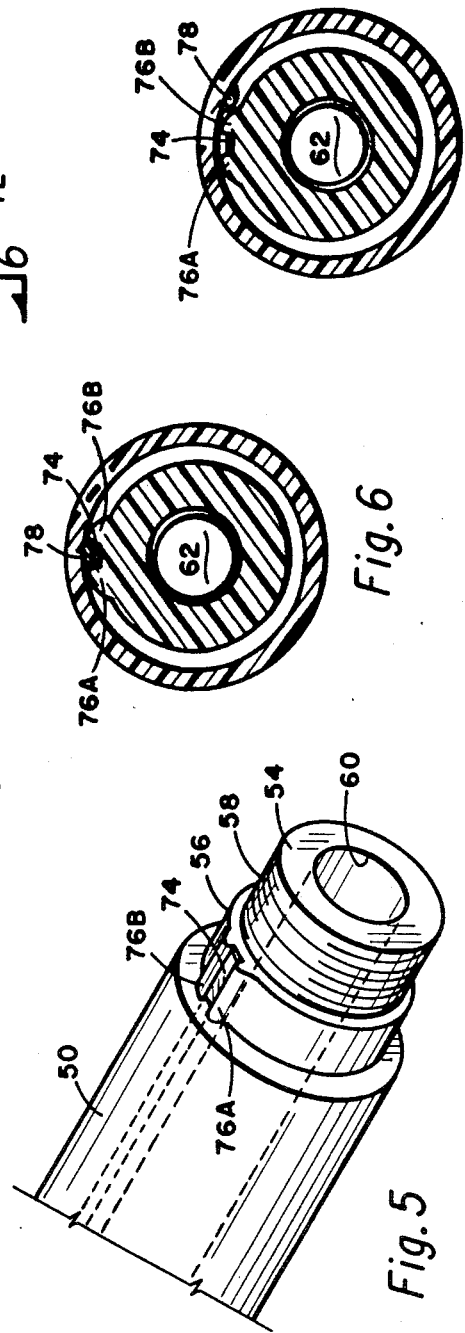

FISHING ROD HANDLE HAVING A LIGHT THEREIN

SUMMARY OF THE INVENTION

Many fisherman like to fish at night and one of the problems of night fishing is that of having a light available so that a fisherman can readily check his lure, remove or add bait to a hook attached to his fishing line or for other purposes. Obviouisly many kinds of light sources are available, such as, flashlights, lanterns and so forth, however, these require the fisherman to lay down the fishing rod to pick up a light source. The present invention simplifies the problem of night fishing by providing a light positioned within the handle of the fishing rod so that the fisherman, when he needs to inspect his lure, change bait, or even to look for an object in the boat from which he is fishing, does not need to search around for a light but has it readily available from the fishing rod that he is using.

Others have provided the concept of a light in a fishing rod handle and for references to prior art relating to the general object, the following U.S. patents are exemplary of the state of the art:

|           |           |
|-----------|-----------|
| 2,805,508 | 2,565,633 |
| 2,283,430 | 2,358,576 |
| 4,479,321 | 3,862,509 |
| 4,048,743 | 4,085,437 |
| 2,640,640 | 4,117,618 |
| 3,017,449 | 2,579,087 |

The present invention is distinguished from the existing art by providing an inexpensive, simplified and yet effective method of providing a light in a fishing rod handle. In the preferred embodiment, the fishing rod handle has an elongated cylindrical opening therein of a diameter to slideably receive a typical dry cell battery of the type used in small diameter flashlights. In the preferred arrangement, two of such batteries are employed in series. A spring positioned in the opening urges the batteries toward the rearward end of the fishing rod. An insert member is attached to the fishing rod handle rearward end. The insert member is of a rigid material, such as, metal. The rigid insert has an integral tubular portion which has an internal reduced diameter circumferential ledge. A bulb is employed of the standard flashlight type which has an integral enlarged diameter flange. The diameter of the flange of the bulb is such that the bulb is slideably receivable within the insert integral tubular portion but larger than the internal diameter of the circumferential ledge.

Retained in the rigid insert is a switch, which may be of the push-button type, that is, where one push of the button turns the switch "on" and the second push of the button turns it "off". When the insert member is secured to the end of the fishing rod with the integral tubular portion coaxial with the circumferential opening, the insert retains the batteries within the cylindrical opening. The electrode on the battery adjacent the handle rearward end contacts a corresponding electrode on the bulb. Wiring connects the switch, the bulb and the batteries so that when the switch is in the "on" position the bulb is illuminated.

The rigid insert member can be attached to the fishing rod by a single screw so that by removing one screw the bulb and/or batteries can be expeditiously replaced.

In an alternate embodiment of the invention the fishing rod handle, which has an elongated cylindrical opening therein, has a reduced diameter externally threaded portion at the handle rearward end. A handle end member has internal threads so that it can be threaded onto the handle rearward end. The handle end member has an opening coaxial with the opening in the handle. The opening in the end member is of a smaller diameter providing an internal circumreferential ledge.

In the alternate embodiment, the bulb flange is secured between the end member ledge and the rearward end of the handle. In addition, switching action is provided between the threadably rotatable end member and the handle so that by rotation of the end member the bulb can be energized as needed.

A better understanding of the invention will be had by reference to the following specification and claims, taken in conjunction with the attached drawings.

DESCRIPTION OF VIEWS

FIG. 4 is an elevational view, showing partially cross-section, of an alternate embodiment of the invention, that is, showing a fishing rod handle with a concentrically threaded handle end member which serves the dual function of first retaining the bulb and batteries in the handle and second, providing switch action by the threaded rotation thereof.

FIG. 5 is an isometric partially end view of the fishing rod handle of FIG. 4 with the handle end member removed.

FIG. 6 is a cross-sectional view taken along the line of 6.6, FIG. 4, showing the handle end portion rotated to the "on" switch position.

FIG. 7 is a cross-sectional view as in FIG. 6 but showing the handle end member rotated to the "off" portion.

DETAILED DESCRIPTION

Figure 1:
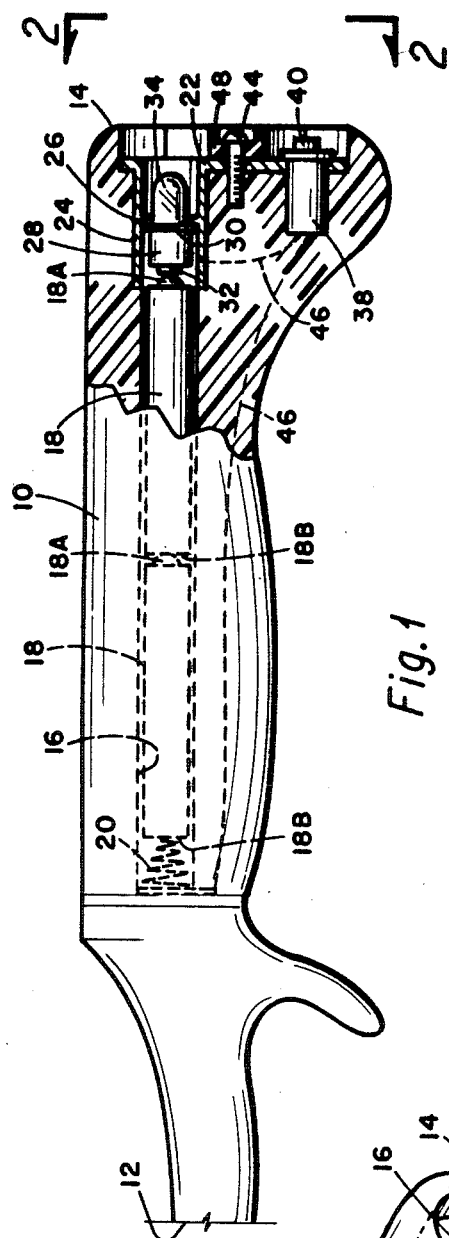
FIG. 1 is an elevational view, showing partially in cross-section, of a typical fishing rod handle and showing the means of retaining a light within the handle.
Figure 2:
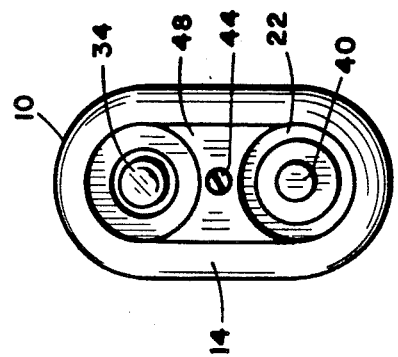
FIG. 2 is an end view of the handle in FIG. 1.

Referring to the drawings and first to FIG. 1, the handle of the fishing rod is indicated by the numeral 10. At the forward end 12 of the handle, which is shown truncated, means is provided for attachment of a fishing rod. Since a fishing rod and means of attachment of the same is not part of the invention, it is not shown herein. The handle 10 has a rearward end 14. An elongated cylindrical opening 16 is provided in handle 10 communicating with the rearward end 14, the diameter of the cylindrical opening 16 being such as to receive one or more standard size flashlight batteries 18 (two being shown). Each of the flashlight batteries has electric contacts 18A and 18B on the opposite ends. A spring 20 is placed in the cylindrical opening 16 to urge the batteries 18 toward the rearward end 14.

Secured to the handle rearward end 14 is a rigid insert member 22 which may be made of hard plastic or metal. The rigid insert 22 has integral tubular portion 24 which is slideably recieveable within the cylindrical opening 16 and, for that purpose, the internal diameter of the cylindrical opening is slightly enlarged. Formed within the tubular portion 24 is an internal circumferential reduced diameter ledge 26.

A typical flashlight bulb 28 has an integral enlarged diameter flange 30. The diameter of flange 30 is less than the internal diameter of the integral tubular portion 24 but greater than the internal diameter of the ledge 26. When the insert 22 is in position, battery 18, and more specifically, battery contact 18A, engages contact 32 on bulb 28, to retain the bulb in position with flange 30 against ledge 26. The bulb has a lens 34.

Figure 3:
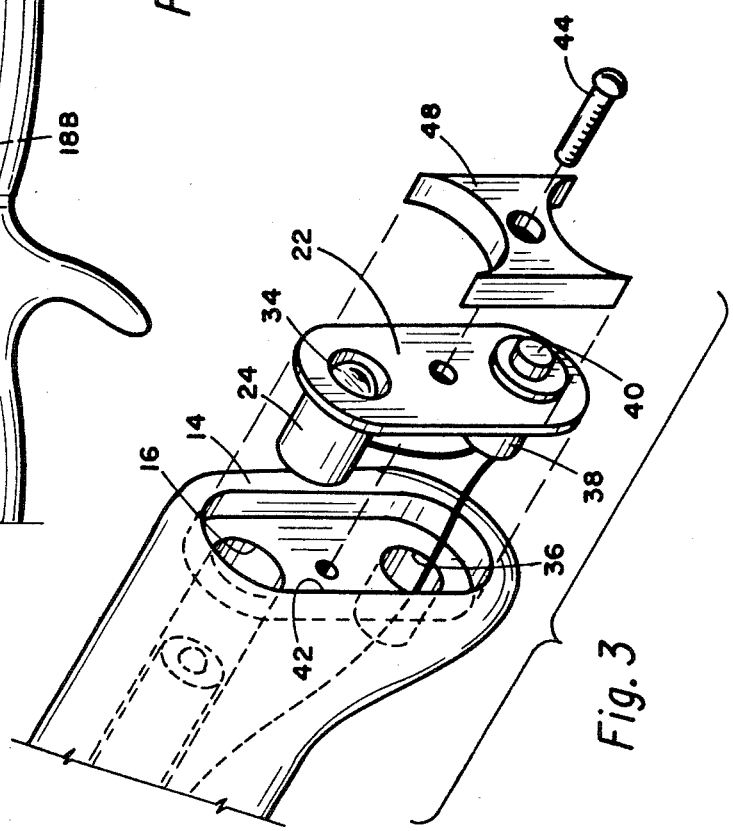
FIG. 3 is an isometric exploded view showing the rearward portion of the handle and showing the rigid insert removed from the end of the handle.

In illustrated FIG. 3, handle 10 has a second, shorter length, cylindrical opening 36 therein which is spaced from but parallel to the first cylindrical opening 16. This opening receives a switch 38 which has an "on" and "off" push-button 40. Switch 38 is secured to the rigid insert 22.

In the arrangement illustrated, the rearward end 14 of the handle member has a recess 42 which receives the rigid insert 22 so that the push-button 40 is contained within such recess. This helps reduce the possibility of the push-button being accidently turned "on" or "off".

A bolt 44, extending through an opening in the insert 22 retains the insert in position. Wiring 46 is provided in the usual way to connect the switch 38, the battery 18 and the bulb 28 so that when the switch push-button 40 is activated to turn the switch on the "on" position bulb 34 is illuminated and when to the "off position, the buld is also off.

An H-shaped grommet 48 is held in place by bolt 44 to further protect the end of the assembled handle and a switch push-button 40 to prevent inadvertent actuation of the switch.

FIGS. 4–7 shows an alternate embodiment of the invention. In this embodiment, fishing rod handle 50 is of the cylindrical type. The handle 50 has a forward end 52 adaptable to receive a fishing rod. The fishing rod is not shown since such is not related to the invention and may be of standard, well-known construction. The handle 50 has a rearward end 54. Adjacent the rearward end 54 the handle has a first reduced diameter portion 56 spaced from the end 54 and a second, smaller external diameter and externally threaded portion 58 which is contiguous to the handle rearward 54.

The handle has an elongated cylindrical opening 60 therein of a diameter to slideably receive flashlight batteries 62 of the standard type. Each of the batteries 62 has electrical contacts 62A and 62B on the opposed ends thereof in the standard arrangement. A spring 64 urges battery 62 toward the handle rearward end 54.

A handle end member 66 has a cylindrical opening therethrough, the opening being formed of three concentric but varying diameter portions 68A, 68B and 68C. The intermediate internal diameter portion 68B is internally threaded and is threadable upon the handle externally threaded portion 58. The difference in diameter between the opening 68A and 68B provides an internal ledge 70.

A bulb 72 of the standard flashlight type is employed having a contact point 72A on one end and a lens 72B on the other end. Intermediate the contact point 72A and the lens 72B is an integral flange 72C. The flange 72C is a diameter greater than the diameter of the cylindrical opening 60 in the handle and also greater than the internal diameter 68A in the end member 66. Thus, when the end member is threaded onto the end of the handle the bulb flange 72C is secured between the internal ledge 70 and the handle end 54.

A conductor 74 communicates with the forward most battery contact point 62B, such as through spring 64, and one end is exposed on the handle reduced diameter portion 56. The handle external diameter portion 56 is provided with two increased diameter rigids 76A and 76B to either side of the exposed conductor 74. A second conductor 78 communicates with bulb 72, such as with the flange 72C, and is exposed on the end member internal opening 68C.

The rotation of the end member 66 provids a switch action. As shown in FIG. 6, conductor 78 positioned between rigids 76A and 76B is in contact with conductor 74, completing the circuit between the batteries and the bulb 72 to illuminate the bulb. When the end member 66 is rotated slightly, so that the conductor 78 is not in position between the rigids 76A and 76B and is not in contact with conductor 74, the circuit is incomplete and the bulb 72 is not illuminated.

If the end member 76 is formed of a conductive material, such as metal, the employment of the conductor 78 is not necessary and all that is required is the provision of an inwardly extending portion of the member to take the place of the conductor 78 as shown in FIGS. 6 and 7.

It can be seen that the end member 76 serves the dual purposes of retaining the bulb 27 and batteries 62 within the end of the handle 50 and also preforms a switch function. To replace the batteries and bulb the end member 66 is completely unscrewed.

The rigids 76A and 76B combine with the conductor 78, or its equivalent if the end member 66 is formed entirely of a conducting material, provides rotational resistance to prevent the end member from being inadvertently unthreaded.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A fishing rod handle having a light in the handle thereof comprising:
    a fishing rod handle having means at the forward end thereof for attachment of a fishing rod, having a rearward end, and having an elongated cylindrical opening therein communicating with said rearward end;
    a rigid insert member having an integral tubular portion, the insert member being attachable to said handle rearward end with said tubular portion received within said handle cylindrical opening;
    a bulb retained witin in said insert member tubular portion, the bulb having an electrical contact on the rearward end thereof and the forward end having a lens;

at least one battery positioned within said handle cylindrical opening, the battery having electrical contacts on the opposed ends thereof;

means within said handle cylindrical opening urging said battery and thereby one of said electrical contacts thereon into engagement with said bulb electrical contact;

a switch means secured to said insert member having an "on" and an "off" position;

circuit means connecting said battery, said switch and said bulb to energize said bulb when said switch is "on"; and means to removably retain said insert member to said handle rearward end.

2. A fishing rod handle according to claim 1 wherein said handle has a second cylindrical opening therein spaced from and parallel to said first mentioned opening, said second opening receiving said switch means.

3. A fishing rod handle according to claim 1 wherein said insert member integral tubular portion includes an internal circumferential reduced internal diameter ledge, and wherein said bulb has an enlarged diameter circumferential flange, the diameter of said bulb flange being less than the internal diameter of said insert member tubular portion and less than the internal diameter of said ledge, said internal ledge serving as said means of refaining said bulb in said insert tubular portion.

4. A fishing rod handle having a light therein comprising:

a fishing rod handle having means at the forward end thereof for attachment of a fishing rod, having a cylindrical opening therein communicating with said rearward end, and having an integral reduced external diameter portion concentric with said cylindrical opening, the reduced diameter portion having external threads thereon;

at least one battery received in said handle tubular opening, the battery having electrical contacts on the opposed ends thereof;

a handle end member having a forward end and a rearward end and a central opening therethrough, the opening being formed of a first enlarged internal diameter internally threaded portion communicating with said forward end and a concentric, reduced diameter portion communicating with said rearward end providing an internal ledge therein, the handle end member being threadable onto said handle reduced diameter portion;

a bulb having an electrical contact portion on one end thereof and a lens on the other end and having, intermediate the two ends, an enlarged diameter flange portion, the diameter of the flange being greater than said cylindrical opening in said handle greater than said reduced portion diameter portion of said opening in said end member and less than said end member enlarged internal diameter threaded portion whereby said bulb flange is retained between said handle rearward end and said end member internal ledge;

means within said handle cylindrical opening urging said battery and thereby one of said electrical contacts thereon into engagement with said bulb electrical contact;

switch means having an "on" and an "off" condition actualizable by the threaded rotation of said end member relative to said handle; and circuit means connecting said battery, said switch and said bulb to energize said bulb when said switch means is in the "on" condition.

5. A fishing rod handle according to claim 4 wherein a portion of said circuit means is carried by said handle and a portion is carried by said end member and wherein said circuit means portions are in contact with each other when said end member is rotated to the "on" condition.

6. A fishing rod handle according to claim 4 including means of varying the rotational resistance of said end member relative to said handle and wherein the rotation resistance is related to the "on" and "off" condition of said circuit means.

* * * * *